(12) United States Patent
Akakura et al.

(10) Patent No.: US 11,159,426 B2
(45) Date of Patent: Oct. 26, 2021

(54) PACKET PROCESSING DEVICE AND NETWORK SYSTEM

(71) Applicant: FUJITSU LIMITED, Kawasaki (JP)

(72) Inventors: Yoshinari Akakura, Oyabe (JP); Norikazu Hikimochi, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 16/847,234

(22) Filed: Apr. 13, 2020

(65) Prior Publication Data

US 2020/0382422 A1  Dec. 3, 2020

(30) Foreign Application Priority Data

May 27, 2019  (JP) .............................. JP2019-098260

(51) Int. Cl.
| | |
|---|---|
| *H04L 12/741* | (2013.01) |
| *H04L 12/717* | (2013.01) |
| *H04L 29/06* | (2006.01) |
| *H04L 12/841* | (2013.01) |
| *H04L 12/855* | (2013.01) |

(52) U.S. Cl.
CPC .............. *H04L 45/74* (2013.01); *H04L 45/42* (2013.01); *H04L 47/2466* (2013.01); *H04L 47/28* (2013.01); *H04L 69/22* (2013.01)

(58) Field of Classification Search
CPC ......... H04L 49/25; H04L 45/74; H04L 45/42; H04L 47/2466; H04L 47/28; H04L 47/6215; H04L 49/3018; H04L 69/22; H04L 47/2441; H04L 49/90; H04L 49/901; H04L 49/9036
See application file for complete search history.

(56) References Cited

U.S. PATENT DOCUMENTS 5,121,383 A * 6/1992 Golestani ................ H04J 3/247
  370/235
5,859,835 A * 1/1999 Varma ................ H04Q 11/0478
  370/229

(Continued)

FOREIGN PATENT DOCUMENTS

| JP | 2001-144709 A | 5/2001 |
|---|---|---|
| JP | 2007-306542 A | 11/2007 |

(Continued)

*Primary Examiner* — Wutchung Chu
(74) *Attorney, Agent, or Firm* — Fujitsu Patent Center

(57) ABSTRACT

A packet processing device includes: a non-priority packet storage that stores the non-priority packet; a gate provided on an output side of the non-priority packet storage; plural priority packet storages that respectively store the priority packet; a distributer that guides a received priority packet to a priority packet storage corresponding to a delay time of a route through which the received priority packet is transmitted; a timing setting unit that sets different read cycles to respective priority packet storages; a read controller that reads priority packets from the plural priority packet storages according to the read cycles; and a gate controller that controls the gate according to the timings on which the read priority packets are output. When the read controller reads a first priority packet from one of the priority packet storages, the read controller reads a second priority packet from another priority packet storage.

6 Claims, 18 Drawing Sheets

(56) References Cited

U.S. PATENT DOCUMENTS

| | | | | |
|---|---|---|---|---|
| 7,826,469 B1* | 11/2010 | Li | ............... | H04L 47/6215 |
| | | | | 370/412 |
| 7,936,770 B1* | 5/2011 | Frattura | ............ | H04L 49/90 |
| | | | | 370/412 |
| 2002/0061027 A1* | 5/2002 | Abiru | ............... | H04L 47/60 |
| | | | | 370/413 |
| 2003/0219014 A1* | 11/2003 | Kotabe | ............ | H04L 47/2433 |
| | | | | 370/375 |
| 2004/0208120 A1* | 10/2004 | Shenoi | ............ | H04L 65/80 |
| | | | | 370/229 |
| 2005/0002410 A1* | 1/2005 | Chao | ............ | H04L 49/1523 |
| | | | | 370/412 |
| 2005/0063392 A1* | 3/2005 | Ofuji | ............ | H04W 28/02 |
| | | | | 370/395.42 |
| 2011/0090805 A1* | 4/2011 | Chen | ............ | H04L 47/628 |
| | | | | 370/252 |
| 2012/0213075 A1* | 8/2012 | Koie | ............ | H04L 47/2441 |
| | | | | 370/235 |
| 2016/0365920 A1 | 12/2016 | Takemoto et al. | | |
| 2019/0215832 A1 | 7/2019 | Nishimura | | |

FOREIGN PATENT DOCUMENTS

| | | |
|---|---|---|
| JP | 2018-125597 A | 8/2018 |
| JP | 2019-004379 A | 1/2019 |
| WO | 2015/129167 A1 | 9/2015 |

\* cited by examiner

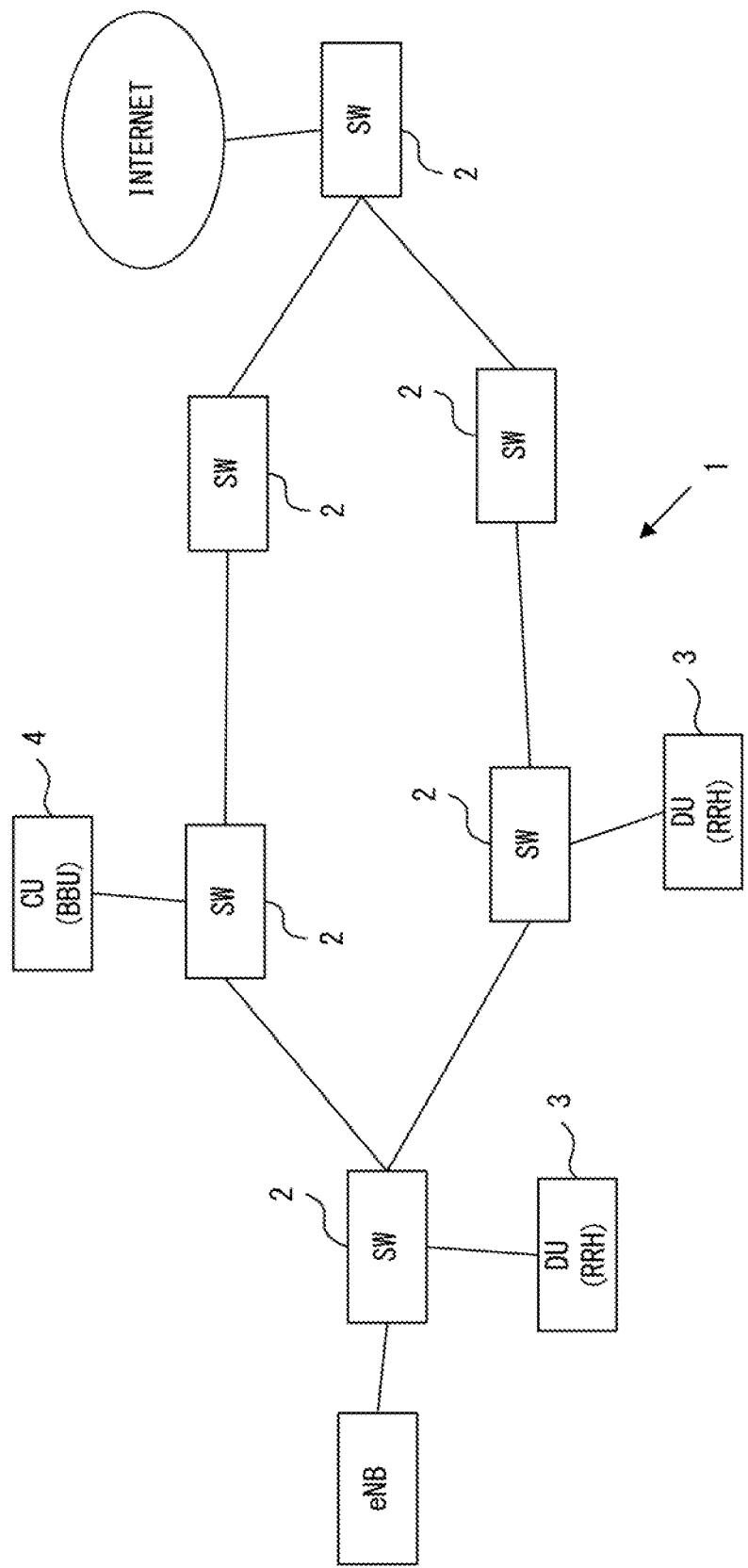
F I G. 2

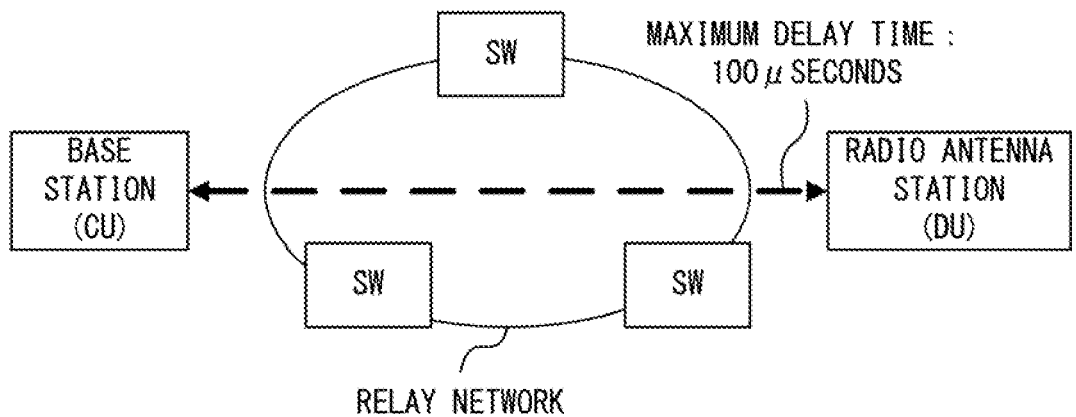
F I G. 4 A
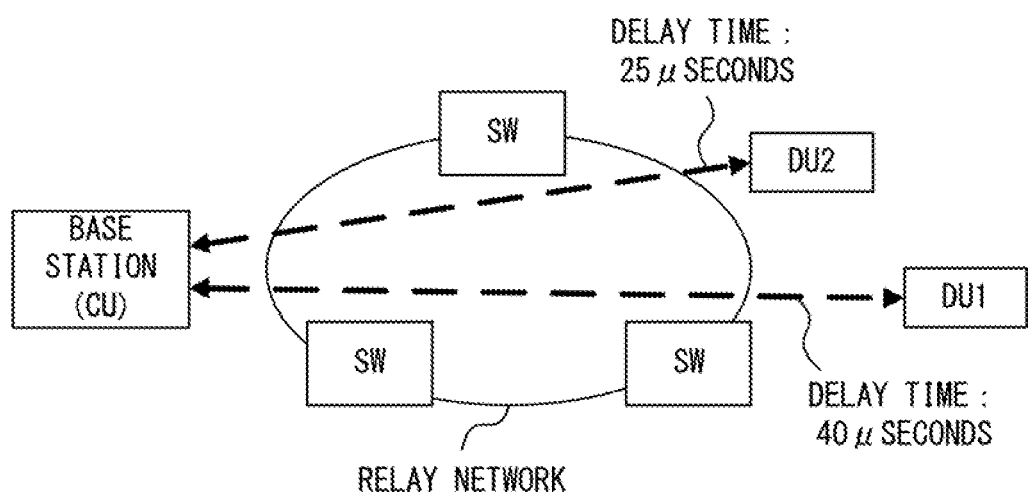
F I G. 4 B

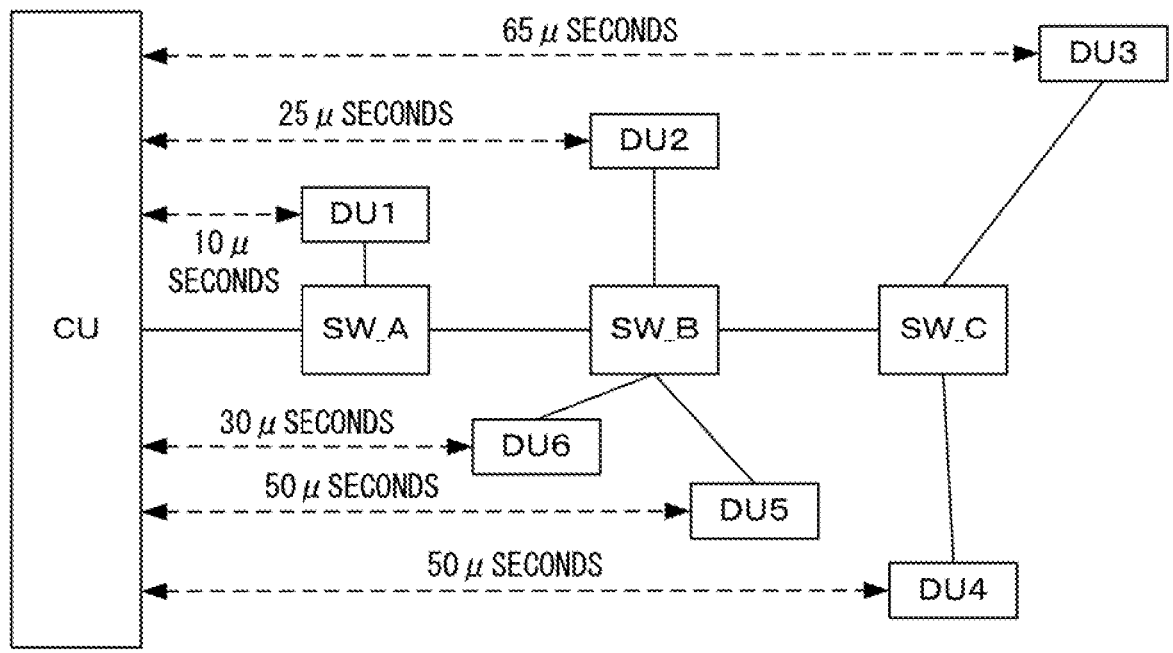
F I G. 6 A
| SWITCH | ROUTE | DELAY MARGIN TIME ($\mu$ SECONDS) |
|---|---|---|
| SW_A | DU1 | 80 (=100-10-10) |
| SW_B | DU2 | 65 (=100-25-10) |
| SW_B | DU5 | 40 (=100-50-10) |
| SW_B | DU6 | 60 (=100-30-10) |
| SW_C | DU3 | 25 (=100-65-10) |
| SW_C | DU4 | 40 (=100-50-10) |
F I G. 6 B

| ROUTE | DELAY TIME | DELAY MARGIN TIME | PRIORITY QUEUE |
|---|---|---|---|
| DUa1 | 37 $\mu$ SECONDS | 53 $\mu$ SECONDS | 3 |
| DUa2 | 14 $\mu$ SECONDS | 76 $\mu$ SECONDS | 4 |
| DUa3 | 67 $\mu$ SECONDS | 23 $\mu$ SECONDS | 2 |
| ANOTHER SW | NO MEASUREMENT | — | 0 |

F I G. 8 A

←——— DISTRIBUTION POLICY ———→

| DELAY MARGIN TIME | PRIORITY QUEUE | FORWARD TIMING |
|---|---|---|
|  | 0 | IMMEDIATELY |
| 9 $\mu$ SECONDS OR LESS | 1 | EVERY 2 $\mu$ SECONDS |
| 10~29 $\mu$ SECONDS | 2 | EVERY 10 $\mu$ SECONDS |
| 30~59 $\mu$ SECONDS | 3 | EVERY 30 $\mu$ SECONDS |
| 60 $\mu$ SECONDS OR MORE | 4 | EVERY 60 $\mu$ SECONDS |

←——— READING POLICY ———→

F I G. 8 B

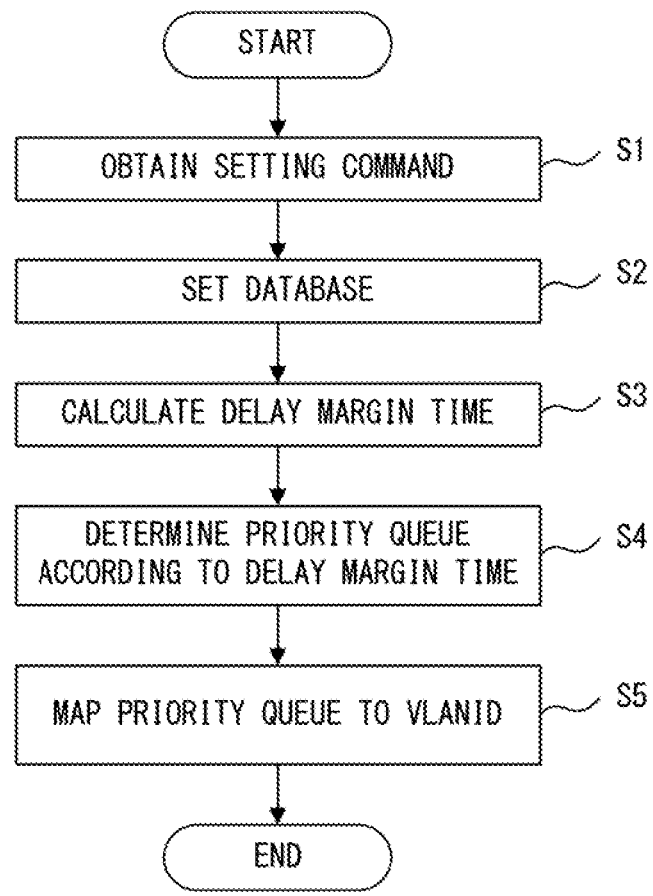
F I G. 12

PACKET PROCESSING DEVICE AND NETWORK SYSTEM

CROSS-REFERENCE TO RELATED APPLICATION

This application is based upon and claims the benefit of priority of the prior Japanese Patent Application No. 2019-098260, filed on May 27, 2019, the entire contents of which are incorporated herein by reference.

FIELD

The embodiments discussed herein are related to a device for processing a packet and a network system for transmitting a packet.

BACKGROUND

In recent years, as a technique for realizing the 5th generation mobile communications system (5G), the MFH (Mobile Front Haul) network including a centralized unit (CU) and a radio antenna station (DU) has been considered. In the MFH network, signals for wireless communication are transmitted between the centralized unit and the radio antenna station. Meanwhile, the centralized unit is also called a base band unit (BBU). In addition, the radio antenna station is also called a remote radio head (RRH).

The MFH network transmits the layer 2 packet. For this reason, a path for the MFH network and a path for another network (the mobile back haul (MBH) network or a wired network, or the like) may share the communication resource. Accordingly, the efficient use of the communication resource is realized.

However, the MFH network places stricter delay time requirements compared with other networks. For this reason, priority control has been proposed in which packets transmitted on the MFH network are processed with priority compared with packets transmitted on other networks. Meanwhile, in the descriptions below, a packet transmitted on the MFH network may be referred to as an "MFH packet" or a "priority packet (high priority packet)". In addition, a packet transmitted on other networks may be referred to as "non-MFH packet" or a "non-priority packet (low-priority packet)".

For example, the Time Aware Shaper (TAS) performs a gate control for the non-MFR packet. The TAS is implemented in each node of the network and includes a gate and a function to control the gate. When forwarding an MFH packet, the TAS stops the output (or forwarding) of non-MFH packets by closing the gate. At this time, the non-MFH packets are stored in the buffer. When the forwarding of the MFH packet is completed, the gate is opened, and the MFH packets stored in the buffer are output. By this function, the delay of the MFH packet is suppressed. Note that the TAS is defined in IEEE 802.1Qbv.

Meanwhile, Japanese Laid-Open Patent Publication No. 2018-125597 describes a packet processing device that controls the output delay of high-priority packets. In addition, Japanese Laid-Open Patent Publication No. 2019-004379, Japanese Laid-Open Patent Publication No. 2007-306542, Japanese Laid-Open. Patent Publication No. 2001-144709, and WO2015/129167 also describes related arts.

As described above, the TAS stops the output of non-MFH packets by closing the gate when the MFH packet passes through the node. At this time, as illustrated in FIG. 1A, a margin period is respectively set before and after the period in which the gate is closed. Here, the output of non-MFH packets is also stopped in the margin periods. That is, for each MFH packet, the margin periods in which the output of non-MFH packets is stopped are set. For this reason, when the frequency of MFH packets passing through the TAS becomes high, the period in which the non-MFH packets cannot be output due to the margin periods also becomes longer, and the bandwidth for the non-MFH communication decreases.

Meanwhile, when the interval between MFH packets is short, the gate control by the TAS may not be able to catch up. For this reason, when the interval between MFH packets is shorter than a specified threshold, as illustrated in FIG. 1B, the TAS holds the gate closed during the period between two MFH packets (that is, a gap period). Therefore, this may also cause a decrease in the bandwidth of the non-MFH communication.

SUMMARY

According to an aspect of the embodiments, a packet processing device processes a priority packet and a non-priority packet with a priority lower than the priority of the priority packet in a network that transmits the priority packet and the non-priority packet. The packet processing device includes: a non-priority packet storage that stores the non-priority packet; a gate provided on an output side of the non-priority packet storage; a plurality of priority packet storages that respectively store the priority packet a distributer that guides a received priority packet to a priority packet storage corresponding to a delay time between a source and a destination of a route through which the received priority packet is transmitted among the plurality of priority packet storages when the packet processing device receives the priority packet; a timing setting unit that sets different read cycles to respective priority packet storages; a read controller that reads priority packets from the plurality of priority packet storages according to the read cycles set by the timing setting unit and outputs the read priority packets; and a gate controller that controls the gate according to the timings on which the read priority packets are output by the timing controller. When the read controller reads a first priority packet from one of the plurality of priority packet storages and outputs the first priority packet, the read controller reads a second priority packet from another one of the plurality of priority packet storages and outputs the second priority packet.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a relay network;

FIGS. 4A and 4B illustrate the delay time of an MFH packet;

FIGS. 6A and 6B illustrate the delay margin time;

FIGS. 8A and 8B illustrate an example of the relationship between the delay of each route and a distribution policy and a reading policy;

FIG. 12 is a flowchart illustrating an example of the mapping of a priority queue;

DESCRIPTION OF EMBODIMENTS

Figure 1A:
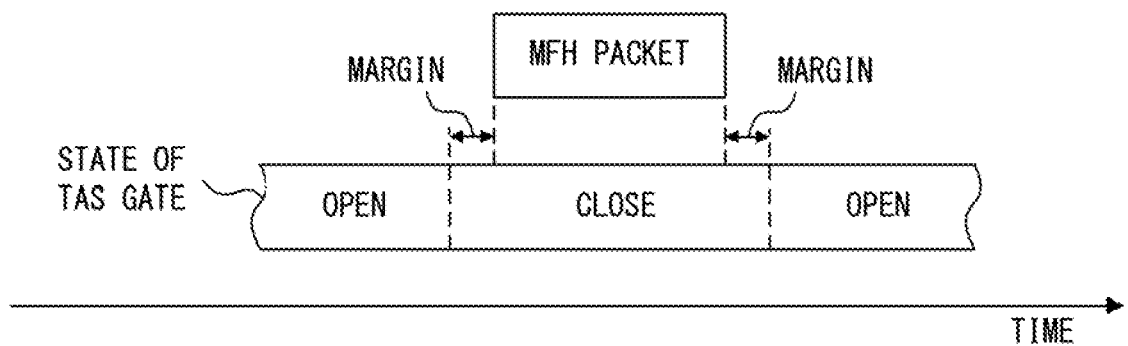
FIGS. 1A and 1B illustrate a challenge in the gate control by the TAS.
Figure 1B:
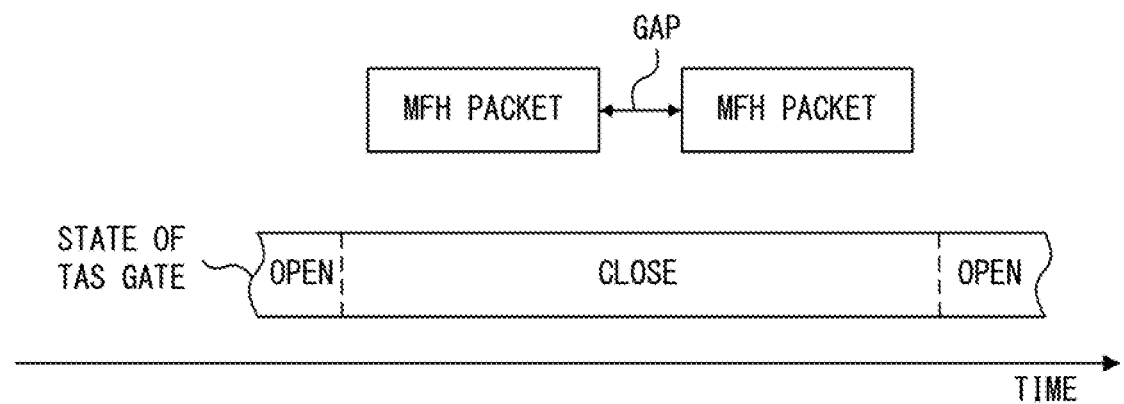

FIG. 2 illustrates an example of a relay network according to an embodiment of the present invention. A relay network 1 includes a plurality of packet switches 2 and transmits layer 2 packets. That is, each packet switch 2 transmits later 2 packets.

The relay network 1 may accommodate any line that transmits layer 2 packets. In this example, the relay network 1 accommodates an MFH line established between a radio antenna station (DU or RRH) 3 and a base station (CPU or BBU) 4. The radio antenna station 3 may accommodate one radio terminals or a plurality of radio terminals. The base station 4 performs scheduling of radio resources between the radio antenna station 3 and each radio terminal. Meanwhile, between the radio antenna station 3 and the base station 4, information or data are stored and transmitted in the MFH packets. In addition, in the descriptions below, the path established between the radio antenna station 3 and the base station 4 may be referred to as an "MFH line".

The relay network 1 also accommodates lines other than the MFH line. For example, the MFH line and other lines that transmits information or data of other wired networks are accommodated in the relay network 1. In the descriptions below, packets transmitted via lines other than the MFH line may be referred to as "non-MFH packets".

Here, compared to the non-MFH packets, MFH packets have stricter requirements regarding delay. For this reason, the packet switch 2 has a priority control function for processing MFH packets with priority.

Figure 3:
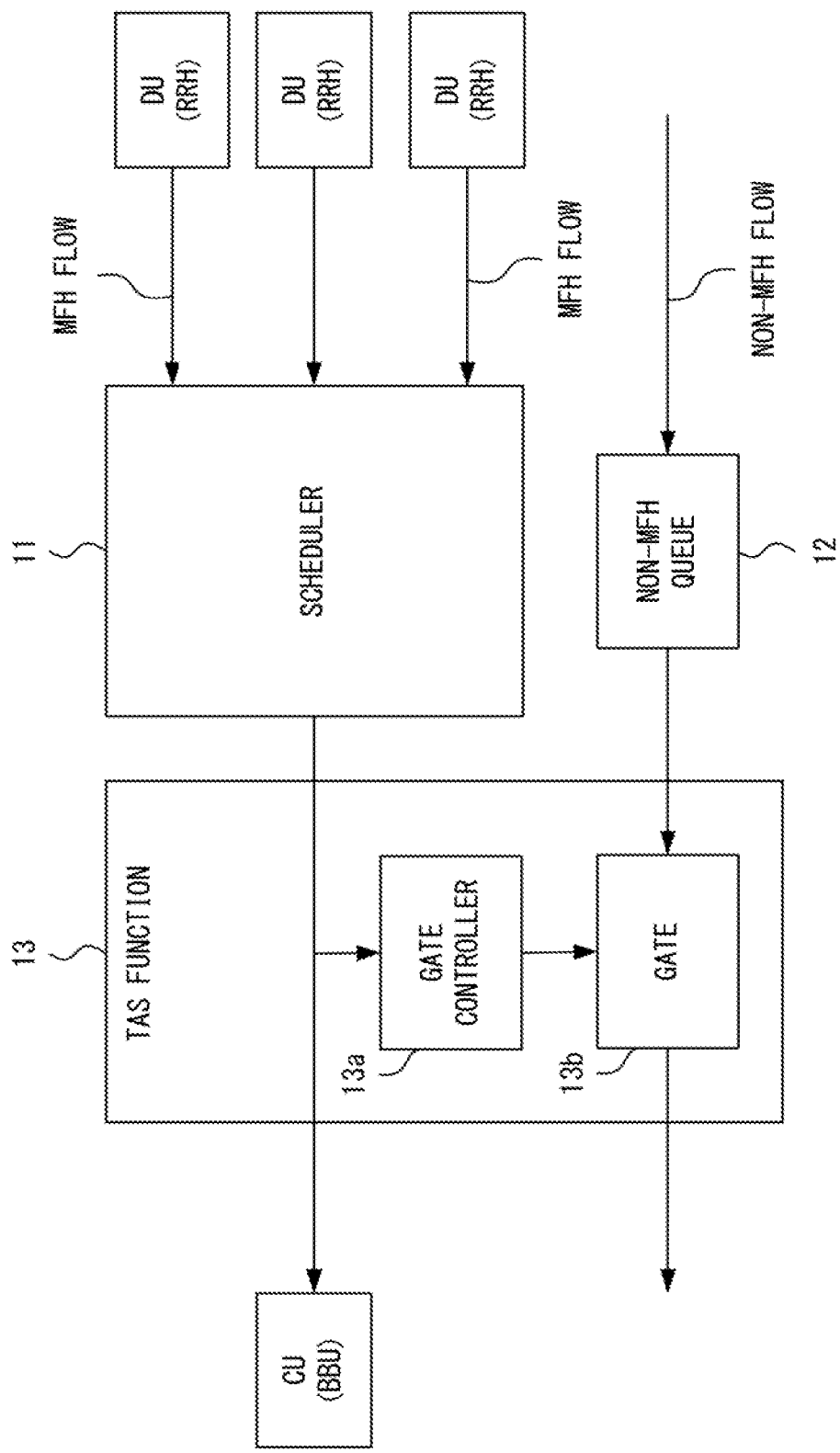
FIG. 3 illustrates an example of a packet switch.

FIG. 3 illustrates an example of the packet switch 2. The packet switch 2 is equipped with a scheduler 11, a non-MFH queue 12 and a TAS function 13, as illustrated in FIG. 3. The packet switch 2 processes the MFH flow and the non-MFH flow. The MFH flow represents the MFH packet that flows from each radio antenna station (DU) to the base station (CU). Meanwhile, the non-MFH flow transmits the non-MFH packets.

The scheduler 11 controls the forward timing of each MFH packets. In this example, the scheduler 11 controls the forward timing of each MFH packets for each DU. The non-MFH queue 12 temporarily stores non-MFH packets.

The TAS function 13 is equipped with a gate controller 13a and a gate 13b. The gate controller 13a controls the gate 13b according to the forwarding of the MFH packet. For example, when the MFH packet is output by the scheduler 11, the gate controller 13a closes the gate 13b. In this case, the non-MFH packets stored in the non-MFH queue 12 cannot go through the gate 13b. That is, when the MFH packet is output by the scheduler 11, the packet switch 2 does not output the non-MFH packet. Accordingly, the priority control for the MFH packet is realized.

FIG. 4A and FIG. 4B illustrates the delay time of the MFH packet. In the MFH, end-to-end delay time is specified. As an example, as illustrated in FIG. 4A, the maximum delay time in the transmission between the DU and the CU is 100 μseconds. That is, the MFH packet transmitted from the DU is required to be forwarded by one or a plurality of packet switches 2 to the CU within 100 μseconds. For this reason, each packet switch 2 performs the priority control, explained with reference to FIG. 3.

The delay time of the MFH packet differs according to the respective route that the MFH packet goes through. In the example illustrated in FIG. 4B, the delay time between the DU1 and the CU is 40 μseconds, and the delay time between the DU2 and the CU is 25 μseconds. Meanwhile, the delay time between the DU and the CU depends on the position of each DU and the performance of each DU, and so on.

As described above, the delay time of the MFH packet differs according to the respective route. In other words, the degree of extra time (or margin) with respect to the maximum delay time differs for the respective route. For example, in a case in which the maximum delay time is 100 μseconds, an MFH packet transmitted from the DU1 to the CU has a margin of 60 μseconds, and an MFH packet transmitted from the DU2 to the CU has a margin of 75 μseconds. In this case, the packet switch 2 can delay the MFH packet transmitted from the DU1 to the CU by up to 60 μseconds and can delay the MFH packet transmitted from the DU2 to the CU by up to 75 μseconds.

Therefore, the packet switch 2 controls the forward timing of the MFH packet using this characteristic. Specifically, the packet switch 2 controls the forward timing of the MFR packet so as to make the time during which the gate 13b illustrated in FIG. 3 is closed short. At this time, the forward timing of each MFH packet is controlled so as to be within the range in which the delay time between each DU and the CU does not exceed the maximum delay time.

Figure 5:
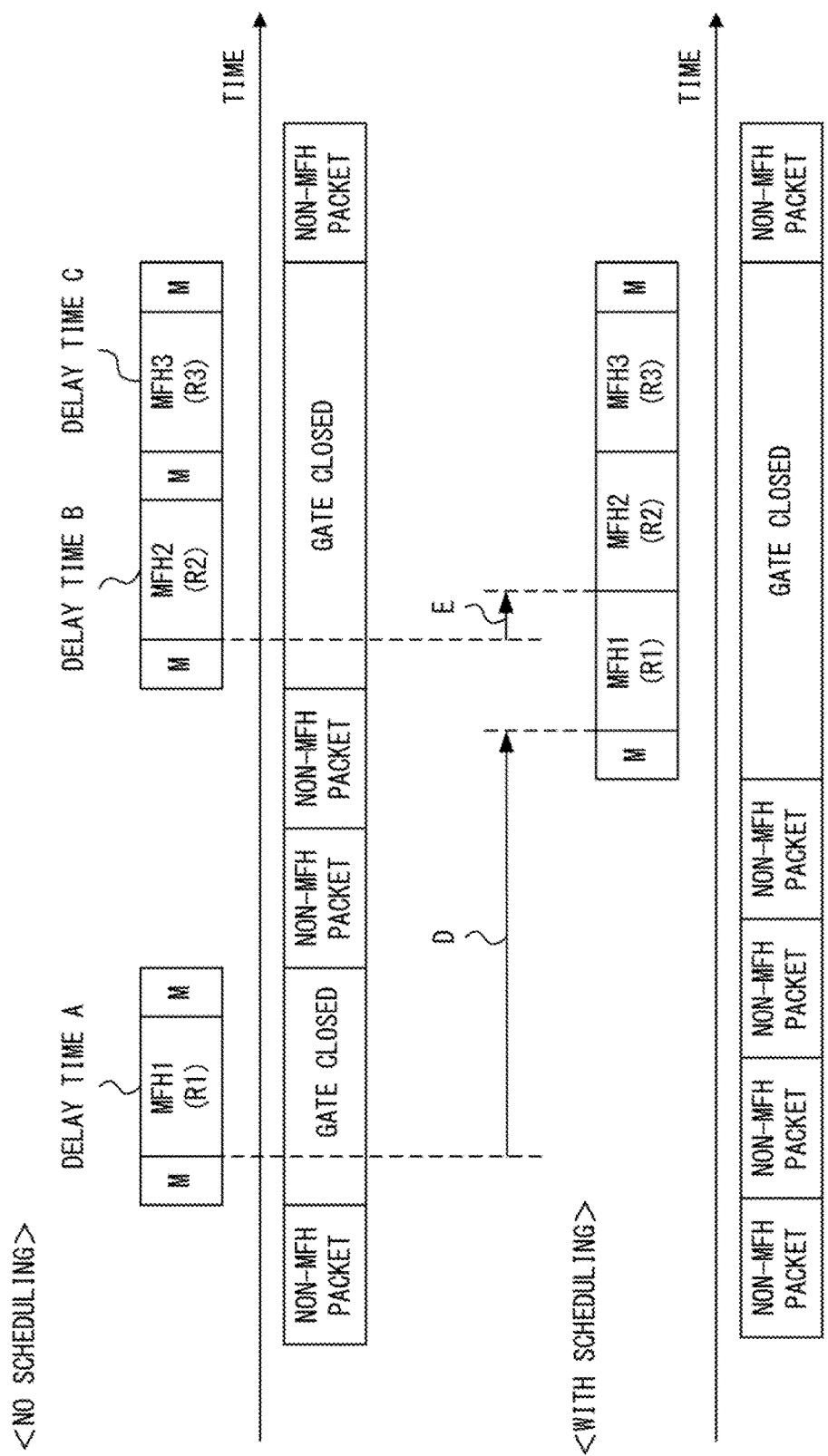
FIG. 5 illustrate be outline of the forward timing control of an MFH packet.

FIG. 5 illustrates an outline of the control of the forward timing of the MFH packet. In this example, it is assumed that non-MFH packets are stored in the non-MFH queue 12 illustrated in FIG. 3. The non-MFH packets are read out and output from the non-MFH queue 12 while the gate 13b is open.

The packet switch receives MFR packets 1-3. In FIG. 5, the MFH packets 1-3 are presented as MFH1 through MFH3. It is assumed that the MFH packets 1-3 are transmitted from DU to CU via routes R1-R3, respectively. Meanwhile, it is assumed that the delay times of the routes R1, R2, R3 are A, B, C, respectively.

When the packet switch 2 forwards the received MFH packets to the CU, the TAS function 13 illustrated in FIG. 3 closes the gate 13b. At this time, a margin period M is set respectively before and after the period during which each of the MFH packets are forwarded. The gate 13b is closed in the margin period M as well.

Here, it is assumed that the packet switch 2 does not perform scheduling according to an embodiment of the present invention. In this case, the margin period M is set for each of the MFH packets 1-3. Therefore, the time during which the gate 13b is controlled to be in the closed state becomes long, and the time for forwarding non-MFH packets is reduced.

By contrast, the scheduler 11 controls the forward timing of the MFH packet so as to make the time during which the gate 13b is closed short. In this example, the scheduler 11 delays the forward timing of the MFH, packet 1 by "D" and delays the forward timing of the MFH packet 2 by "E". At this time, it is preferable to delay the MFH packets 1-2 so that the packets 1-3 are successively output. However, the delay amount D is decided within a range in which the sum of the delay time A of the route R1 and the delay amount D does not exceed the maximum delay time specified with respect to the MFH packet. In a similar manner, the delay amount E is decided within a range in which the sum of the delay time B of the route R2 and the delay amount E does not exceed the maximum delay time.

When the forward timing of the MFH packets is adjusted as described above, in the example illustrated in FIG. 5, the margin period M provided immediately after the MFH packet 1, the margin period M immediately before the MFH packet 2, and the margin period M (or a gap period) provided between the MFH packets 2 and 3 become unnecessary. Accordingly, compared to the ease in which the scheduling is not performed, the total time of periods during which the gate 13b is closed becomes shorter. That is, the communication bandwidth for forwarding non-MFH packets increases. Specifically, in the case in which the scheduling is not performed, four non-MFH packets are forwarded, but in the case in which the scheduler 11 performs the scheduling, five non-MFH packets are forwarded.

Meanwhile, in order to make the total time of periods during which the gate 13b is closed short, it is preferable to reduce margin periods or gap periods. Then, in order to reduce margin periods or gap periods, it is preferable that MFH packets are successively forwarded. Therefore, the packet switch 2 adjusts the output timing of each MFH packet so that received MFH packets are forwarded successively as much as possible, within a range in which the delay time of each MFH packet does not exceed the maximum delay time. Accordingly, both the priority control of MFH packets and the increase in the communication bandwidth for non-MFH packets are realized.

Embodiments

The packet switch 2 calculates the delay margin time for each route of the MFH flow in order to adjust the forward timing of the MFH packet. In the example illustrated in FIGS. 6A and 6B, a route represents the route in which packets are forwarded between each DC and the CU. The delay margin time is calculated according to the delay time in the route.

FIGS. 6A and 6B illustrate the delay margin time. In the example illustrated in FIGS. 6A and 6B, the relay network is equipped with packet switches A through C. The base station (CU) is connected to the packet switch A. One or a plurality of radio antenna stations (DUs) are connected to each of the packet switches A through C. Specifically, the DU1 is connected to the packet switch A (SW_A), the DUs 2, 5, 6 are connected to the packet switch B (SW_B), and the DUs 3, 4 are connected to the packet switch C (SW_C).

The delay time between each DU and the CU has been measured in advance. For example, the delay time of the route between the DU1 and the CU is 10 µseconds, and the delay time of the route between the DU2 and the CU is 25 µseconds. Meanwhile, the delay time between the DU1 and the CU is measured by a known method. In addition, in this example, the route between each DU and the CU corresponds uniquely according to the DU. Therefore, in the descriptions below, the route between the DUi (i=1 through 6) may be referred to as the "route DUi".

The packet switch 2 calculates the delay margin time for each route. Here, the delay margin time of the route DUi is represented by the following expression.

Delay margin time=Maximum delay time−Delay time of the route $Dui$−Adjustment constant The maximum delay time has been determined in advance by a communication standard or the like, and in this example, it is 100 µseconds. The delay time of the route DUi has been measured in advance. The adjustment constant is determined in consideration of the measurement error, production variation, the control time for the delay control by the scheduler 11, and the like, and in this example, it is 10 µseconds.

For example, the delay time of the route between the DU1 and the CU is 10 µseconds. Therefore, the delay margin time of the route (that is, the route DU1) is 80 (=100−10−10) µseconds. In a similar manner, the delay margin time for each route is calculated. The delay margin time for each route DU1 through DU6 is as presented in FIG. 6B.

Figure 7:
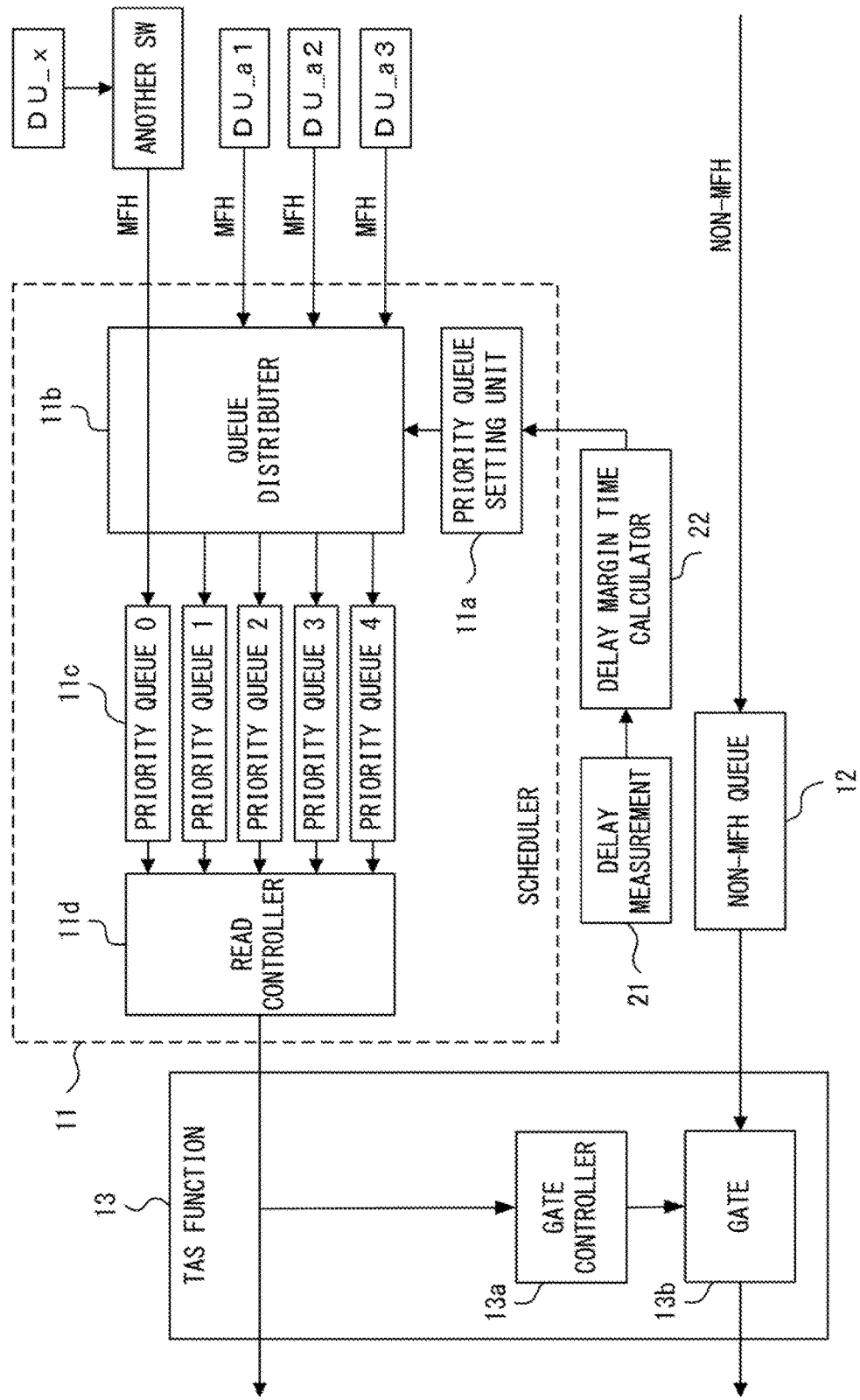
FIG. 7 illustrates an example of the configuration that realizes the adjustment of the forward timing of an MFH packet.

Meanwhile, the delay margin time is calculated by each packet switch 2, for example. In this case, the packet switch 2 calculates the delay margin time of the route between the DU connected to the packet switch 2 itself and the CU. For example, the packet switch A calculates the delay margin time of the route between the DU1 and the CU, and the packet switch B calculates the delay margin time of the routes between the DU2, 5, 6 and the CPU, respectively. However, another device (for example, the base station CU) may calculate the delay margin time of each route and may distribute the calculation result to respective radio antenna station DU, for example, FIG. 7 illustrates an example of the configuration to realize the adjustment of the forward timing of the MFH packet. The packet switch 2 is equipped with the scheduler 11, the delay measurement unit 21, and the margin calculator 22 for adjusting the forward timing of the MFH packet, as illustrated in FIG. 7. In addition, the packet switch 2 is equipped with the non-MFH queue 12 and the TAS function 13, as explained with reference to FIG. 3.

The delay measurement unit 21 is able to measure the delay time of the route that propagates the MFH packet between each DU and the CU. However, the delay time of each route may be measured by another measurement device. In this case, the delay time measured by the other measurement device is given to the delay margin calculator 22. In this case, the packet switch 2 does not have to be equipped with the delay measurement unit 21.

The delay margin calculator 22 calculates the delay margin time for each route. The delay margin time is calculated from the measurement value of the delay time of each route, the maximum delay time, and the adjustment constant.

In this example, three radio antenna stations (DUa1 through DUa3) are connected to the packet switch 2. Therefore, the packet switch 2 measures the delay time for each of the routes between the DUa1 through DUa3 and the base station (CU) and calculates the delay margin time for each of them. The delay time and the delay margin time for each route are as presented in FIG. 8A. Meanwhile, in the descriptions below, the route between DUai (i=1 through 3) and the CU may be referred to as the "route DUai."

Meanwhile, the packet switch 2 may receive an MFH packet from another packet switch. In the descriptions below, the route from a DUx arriving at the CU via another packet switch may be referred to as the "route xSW". Meanwhile, the packet switch 2 does not have to have the delay time and the delay margin time of the route xSW.

The scheduler 11 is equipped with a priority queue setting unit 11a, a queue distributer 11b, a priority queue 11c, and a read controller 11d. Here, the scheduler 11 may also be equipped with other functions that are not illustrated in FIG. 7. Meanwhile, the priority queue 11c includes a plurality of queue buffers. In this example, the scheduler 11 is equipped with priority queues 0-4. Each of the priority queues 0-4 may store received MFH packets.

The priority queue setting unit 11a creates a distribution rule that represents the correspondence relationship between routes that transmits the MFH packet and the priority queues 0-4. Then, the priority queue setting unit 11a gives the created distribution rule to the queue distributer 11b.

It is assumed that the correspondence relationship between a delay margin time of the route that transmits the MFH packet and the priority queue that is to store MFH packets transmitted in the route is determined in advance. For example, in the distribution policy illustrated in FIG. 8B, an MFH packet received via a route with a delay margin of 9 μseconds or less is stored in the priority queue 1. An MFH packet received via a route with a delay margin of 10-29 μseconds is stored in the priority queue 2. An MFH packet received via a route with a delay margin of 30-59 μseconds is stored in the priority queue 3. An MFH packet received via a route with a delay margin of 60 μseconds or more is stored in the priority queue 4.

Then, the distribution rule is created according to the distribution policy. In this example, the delay margin time of the route DUa1 is 53 μseconds, and therefore, as illustrated in FIG. 8A, the priority queue 3 is assigned to the route DUa1. In a similar manner, the delay margin time of the route DUa2 is 76 μseconds, and therefore, the priority queue 4 is assigned to the route DUa2. In addition, the delay margin time of the route DUa3 is 23 μseconds, and therefore, as illustrated in FIG. 8A, the priority queue 2 is assigned to the route DUa3.

The queue distributer 11b stores received MFH packets in the priority queues 0-4 according to the distribution rule given from the priority queue setting unit 11a. Here, the route that each MFH packet passes through is assumed to be identified by VLANID recorded in the packet header. In this example, it is assumed that the path between each DU and the CU is realised by one virtual LAN.

Therefore, the queue distributer 11b stores each received MFH packet in the corresponding priority queue by referring to the VLANID of the received MFH packet. In this example, as illustrated in FIG. 8A, the MFH packet received via the route DUa1 is stored in the priority queue 3. The MFH packet received via the route DUa2 is stored in the priority queue 4 and the MFH packet received via the route DUa3 is stored in the priority queue 2. Meanwhile, the MFH packet received via another packet switch is stored in the priority queue 0.

The read controller 11d read out MFH packets from the priority queues 0-4 according to the reading policy specified in advance. The MFH packets read out from the priority queues 0-4 are output to the network via the TAS function 13. Here, the TAS function 13 does not perform the gate control for the MFH packets.

The reading policy indicates, as illustrated in FIG. 8B, the forward timings for each priority queue. In this example, the priority queue 1 is read out at an interval of 2 μseconds. In a similar manner, the priority queue 2 is read out at an interval of 10 μseconds, and the priority queue 3 is read out at an interval of 30 μseconds, and priority queue 4 is read out at an interval of 60 μseconds. The waiting time for the priority queue 0 is zero. Meanwhile, it is preferable that the reading interval for the priority queue 2 is an integer multiple of that for the priority queue 1. In a similar manner, it is preferable that the reading interval for the priority queue 3 is an integer multiple of that for the priority queue 2, and it is preferable that the reading interval for the priority queue 4 is an integer multiple of that for the priority queue 3.

The TAS function 13 is equipped with the gate controller 13a and the gate 13b, as illustrated in FIG. 7. The gate controller 13a controls the gate 13b according to the forwarding of the MFH packet. For example, when an MFH packet is output by the scheduler 11, the gate controller 13a closes the gate 13b. In this case, non-MFH packets stored in the non-MFH queue 12 cannot pass through the gate 13b. That is, when an MFH packet is output by the scheduler 11, the packet switch 2 does not output the non-MFH packets. Accordingly, the priority control of the MFH packet is realized.

As described above, the packet switch 2 is equipped with a plurality of priority queues 1-4 with different reading cycles. Here, the packet switch 2 is required to process each MFH packet so that the end-to-end maximum delay time is not exceeded. Therefore, a high priority is given to a route with a large delay time. Then, an MFH packet received via a route with a large delay time is stored in a priority queue with a short reading cycle, so that the queue waiting time in the packet switch 2 does not become long. In the example illustrated in FIG. 7 through FIG. 8B, the MFH packet received via the route DUa3 is stored in the priority queue 2. Note that the reading cycle for each priority queue corresponds to the maximum value of the queue waiting time in the packet switch 2.

Meanwhile, for the MFH packet received via a route with a short delay time, the queue waiting time in the packet switch 2 may be made longer, compared to that for the MFH packet received via a route with a long delay time. Therefore, the MFH packet received via a route with a short delay time is stored in a priority queue with a long reading cycle. In the example illustrated in FIGS. 7 through 8B, the MFH packet received via the route DUa2 is stored in the priority queue 4.

For the MFH packet received via another packet switch, a queue waiting time may have already been occurred in the other packet switch. That is, the delay time for the MFH packet received via another packet switch may have already been in a state close to the maximum delay time. For this reason, in the packet switch 2, the MFH packet received via another packet switch is stored in the priority queue 0 whose waiting time is zero. That is, the MFH packet received via another packet switch is stored in the priority queue with the highest priority. Note that a priority queue with a short reading cycle is an example of the priority queue with a high priority, and a priority queue with a long reading cycle is an example of a priority queue with a low priority.

Then, the scheduler 11 reads out and outputs MFH packets from the priority queues 0-4 according to the reading rule below.

(1) When an MFH packet is stored in the priority queue 0, the scheduler 11 immediately reads out the MFH packet. After that, the scheduler 11 reads out MFH packets stored the priority queues 1-4. At this time, it is preferable that MFH packets stored in the priority queues 0-4 are successively read out.

(2) At the read timing of the priority queue i (i=1 through 4), when an MFH packet is stored in the priority queue i, the scheduler 11 reads out the MFH packet. After that, the scheduler 11 reads out MFH packets stored in each priority queue whose priority is lower than that of the priority queue i. For example, when an MFH packet is read out from the priority queue at the read timing of the priority queue X, then the scheduler 11 reads out MFH packets stored in the priority queues 2-4. At this time, it is preferable that the MFH packets stored in the priority queues i through 4 are successively read out.

By reading MFH packets from the priority queues 0-4 according to the reading rule described above, the packet switch 2 is able to output the MFH packets as successively as possible. Here, when the MFH packets are successively output, as explained with reference to FIG. 5, there is no need to provide the margin period M between successive MFH packets. That is, in the TAS function 13, the margin period M is reduced. Therefore, the period during which the gate 13*b* is closed becomes short, and the communication bandwidth for non-MFH packets increases. Meanwhile, it is preferable that the read timings of the priority queues 1-4 are synchronized with each other. In this case, it becomes easier for MFH packets stored in the priority queues 1-4 to be successively output. Note that the "arrows" provided in FIG. 9 respectively represent the read timing.

In addition, the queue waiting time for each MFH packet in the packet switch 2 is decided so as to be smaller than the difference between the delay time of the route that transmits the MFH packet and the maximum delay time specified in a standard or the like. That is, the queue waiting time is set according to the degree of extra time of each route. Therefore, the relay network 1 is able to increase the communication bandwidth for non-MFH packets while satisfying the delay requirements specified in the MFH.

Figure 10:
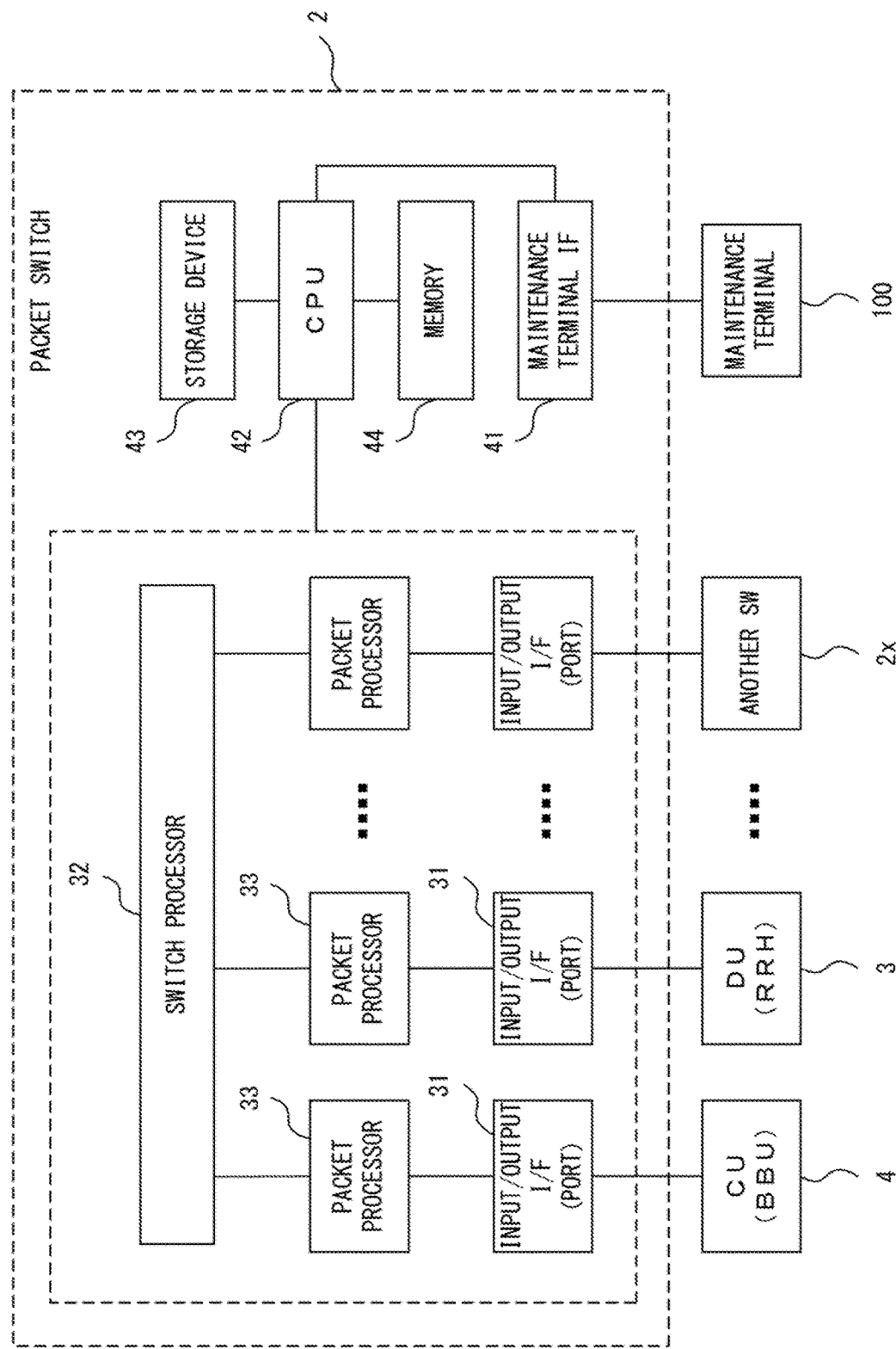
FIG. 10 illustrates an example of the configuration of a packet switch.

FIG. 10 illustrates an example of the configuration of the packet switch 2. The packet switch. 2 is equipped with an input/output IF 31, a switch processor 32, a packet processor 33, a maintenance terminal IF 41, a CPU 42, a storage device 43, and a memory 44. Meanwhile, the packet switch 2 may also be equipped with other devices that are not illustrated in FIG. 10.

The input/output IF 31 provides an interface for connecting to the relay network 1. Meanwhile, the input/output IF 31 may be equipped with an input port and an output port for connecting an optical fiber. In addition, the input/output IF 31 may be equipped with a function for terminating the layer 2 signal.

The switch processor 32 guides a packet received via the input/output IF 31 to the packet processor 31 corresponding to the destination. As an example, according to the VLANID and/or the destination address set in the header of the received packet, the switch processor 32 guides the received packet to the packet processor 33 connected to the corresponding output port. Meanwhile, the switch processor 32 performs the switching process according to the instruction and information given from the CPU 42.

The packet processor 33 performs the priority control of the MFH packet according to the instruction and information given from the CPU 42. Therefore, the packet processor 33 includes the scheduler 11, the non-MFH queue 12, and the TAS function 13. The function of the processor 33 are explained in detail later.

The maintenance terminal IF 41 provides an interface for connecting to the maintenance terminal 100. The maintenance terminal 100 is used by the user or the network administrator. Then, the maintenance terminal 100 generates the instruction and information re larding the setting of the packet switch 2. The instruction and information generated by the maintenance terminal 100 is given to the CPU 42 via the maintenance terminal IF 41.

The CPU 42 controls the operations of the packet switch by executing the program stored in the storage device 43. At this time, the CPU 42 may execute the program using the instruction and information given from the maintenance terminal 100.

The storage device 43 includes a non-volatile memory and stores the program executed by the CPU 42. In addition, the storage device 43 stores information and data used by the CPU 42. Meanwhile, the storage device 43 may be provided outside the packet switch 2. The memory 44 is a volatile memory and is used as the work area of the CPU 42.

Figure 11:
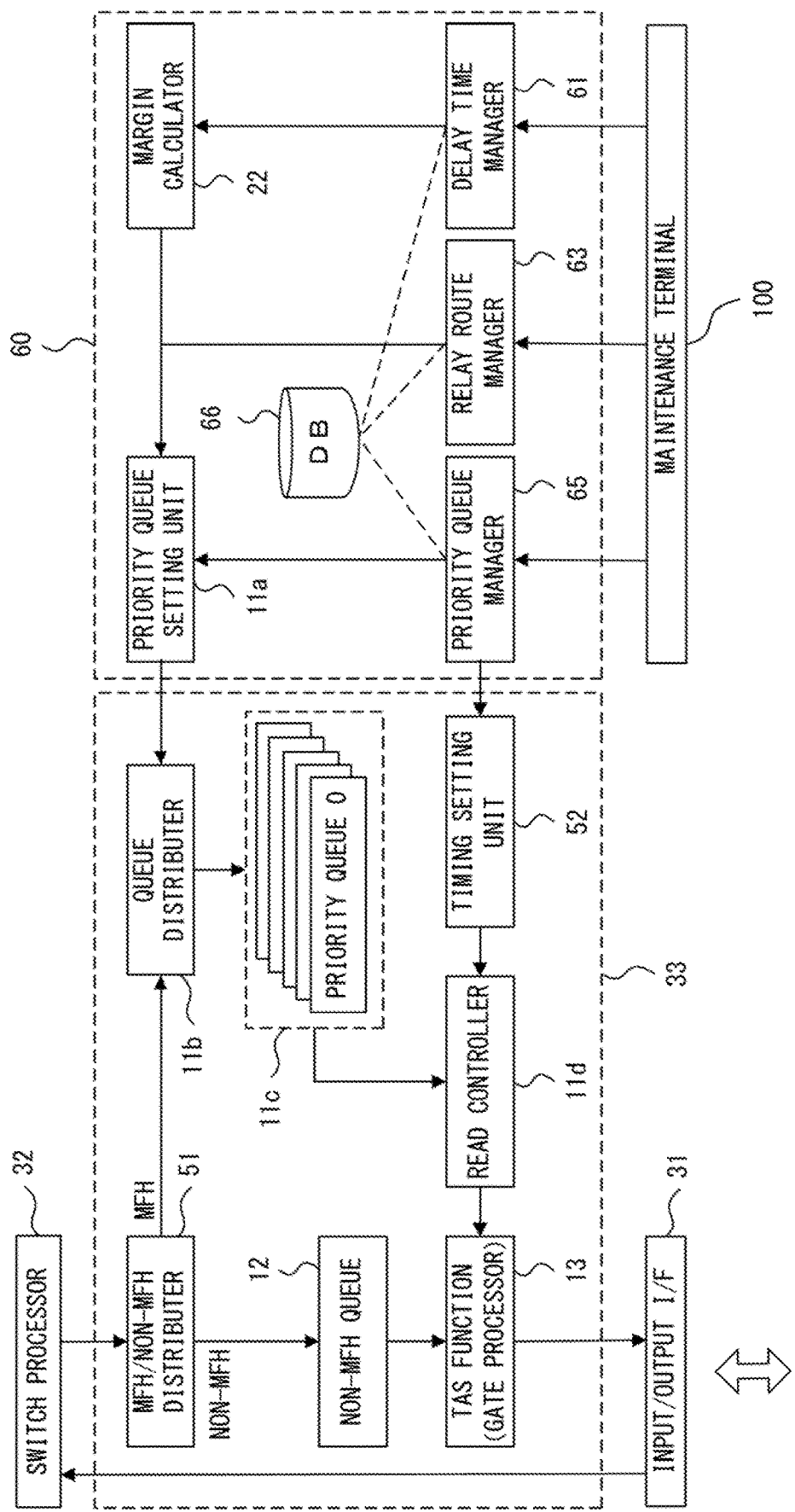
FIG. 11 is a functional block diagram of a packet switch.

FIG. 11 is a functional block diagram of the packet switch 2. The packet switch 2 is equipped with the input/output IF 31, the switch processor 32, and the packet processor 33 as described above. The packet processor 33 is equipped with an MFH/non-MFH distributer 51, the non-MFH queue 12, the TAS function 13, the queue distributer 11*b*, the priority queue 11*c*, the read controller 11*d*, and a timing setting unit 52, as illustrated in FIG. 11.

When a packet (including the MFH packet and the non-MFH packet) arrives at the packet switch 2, the input/output IF 31 guides the received packet to the packet processor 33 corresponding to the destination.

The MFH/non-MFH distributer 51 decides whether or not the received packet is an MFH packet. The type of the packet is identified by the VLANID in the header information of a packet. The MFH packet is guided to the queue distributer 11*b*. Meanwhile, the non-MFH packet is stored in the non-MFH queue 12. The non-MFH queue 12 is a buffer memory and stores non-MFH packets. When the gate of the TAS function 13 is closed, the non-MFH queue 12 holds the non-MFH packets.

The TAS function 13 controls the opening and closing of the gate provided on the output side of the non-MFH queue 12. When the packet switch 2 forwards the MFH packet the TAS function 13 stops the output of non-MFH packets by closing the gate.

According to the priority of the route that transmits the received MFH packet (or the priority of the source DU of the received MFH packet), the queue distributer 11*b* stores the received MFH packet in the corresponding priority queues 0-4. The route that transmits the received MFH packet or the source DU of the received. MFH packet is identified by the VLANID in the header information of a packet. The MFH packet received via another packet switch is stored in the priority queue 0. Meanwhile, the distribution rule that representing the correspondence relationship between the route that transmits the received MFH packet or the source DU of the received MFH packet and the priority queues 0-4 is given from the queue setting unit 11*a*.

The priority queue 11*c* is equipped with a plurality of priority queues. In this example, the priority queue 11*c* includes five priority queues 0-4. The priority queues 0-4 are respectively realized by a buffer memory.

The read controller 11*d* reads out and outputs MFH packets from the priority queues 0-4 according to the reading cycle (or the reading timing) set for each of the priority queues 0-4. When the read controller 11*d* reads out an MFH packet from a priority queue of a certain priority, it also reads out and outputs an MFH packet from a priority queue with a lower priority. That is, MFH packets are successively read out from two or more priority queues. In addition, when any of the priority queues 0-4 becomes full, the read controller 11d reads out the MFR packet from the priority queue regardless of the specified reading cycle. In this case, the read controller 11d also reads out and outputs an MFH packet from a priority queue with a priority that is lower than that for the priority queue that became full.

The timing setting unit 52 is able to change the forward timing by the read controller 11d according to the instruction from a priority queue manager 65 described later.

The packet switch 2 is equipped with a software processor 60 for controlling the packet processor 33. The software processor is equipped with a delay time manager 61, the margin calculator 22, a relay route manager 63, the priority queue setting unit 11a, the priority queue manager 65, and a database 66. Meanwhile, the delay time manager 61, the margin calculator 22, a relay route manager 63, the priority queue setting unit 11a, the priority queue manager 65 are realized by the CPU 42 illustrated in FIG. 10 executing the software program stored in the storage device 43, for example.

In the description below, the route between a DU connected to the packet switch 2 and the CU may be referred to an "MFH route". In addition, the route between a DU connected to the packet switch 2 via another packet switch and the CU may be referred to a "relay route".

The delay time manager 61 obtains, from the maintenance terminal 100, the measurement value of the delay time regarding each MFH route for which the packet switch 2 itself is to set the delay margin time. Meanwhile, the delay time manager 61 sets the delay margin time for each of the routes between the respective DUs connected to the packet switch 2 and the CU. In addition, the delay time manager 61 obtains the adjustment constant. The measurement value of the delay time and the adjustment constant are stored in the database 66. When it is impossible to obtain the measurement value and/or the adjustment constant from the maintenance terminal 100, default values prepared in advance are used.

The margin calculator 22 calculates the delay margin time for each route according to the measurement value of the delay time and the adjustment constant stored in the database 66. The delay margin time is calculated from the following expression, for example.

Delay margin time=Maximum delay time−Delay time of the route $DUi$−Adjustment constant The relay route manager 63 obtains identification information (for example, VLANID) for identifying the MFH packet received via another packet switch from the maintenance terminal 100. The identification information substantially identifies the relay route. Then, the relay route manager 63 may associate the identification information with the priority queue 0. Meanwhile, the identification information obtained from the maintenance terminal 100 is stored in the database 66.

The priority queue setting unit 11a creates the distribution rule that represents the correspondence relationship between the respective MFH routes and the priority queues 1-4 according to the delay margin time calculated by the margin calculator 22 for the respective MFH routes. The respective MFH routes are identified by the VLANID, for example. In addition, in the distribution rule, the MFH packet received via another packet switch is associated with the priority queue 0. Meanwhile, FIG. 8A illustrates an example of the distribution rule. Then, the created distribution rule is given to the queue distributer 11b.

The priority queue manager 65 sets information regarding the forward timing of each priority queue, according to the instruction given from the maintenance terminal 100. For example, information that indicates the range of the delay margin time and the forward timing or the reading cycle) illustrated in FIG. 8B is given from the maintenance terminal 100. These pieces of information are stored in the database 66. When it is impossible to obtain information regarding the forward timing from the maintenance terminal 100, default values prepared in advance are used.

Meanwhile, the software processor 60 may control a plurality of packet processors 33. In addition, the scheduler 11 illustrated in FIG. 7 may be realized by a combination of software and a hardware circuit. For example, the priority queue setting unit 11a may be realized by software.

Flowchart

FIG. 12 is a flowchart illustrating an example of the mapping of the priority queue. The process in this flowchart is executed in the initial setting before the packet switch 2 starts operations. Hereinafter, the configuration of the functional block diagram in FIG. 11 is used for the explanation.

In S1, the delay time manager 61 obtains a setting command from the maintenance terminal 100. The setting command includes the correspondence relationship between the VLANID and the measurement value of the delay time, for each of the routes that transmits MFH packets. In 62, the delay time manager 61 stores the setting command in the database 66.

In S3, the margin calculator 22 calculates the delay margin time of each route. The delay margin depends on the difference between the maximum delay time and the measurement value of the delay time. In S4, the priority queue setting unit 11a determines the priority queues 1-4 corresponding to respective routes according to the delay margin time. At this time, the priority queue setting unit 11a determines the priority queues 1-4 corresponding to respective routes according to the distribution policy illustrated in FIG. 8B, for example. For example when the delay margin time of a route is 40 μseconds, the priority queue 3 is assigned for the route. The distribution rule representing the correspondence relationship between the routes and the priority queues is given from the priority queue setting unit 11a to the queue distributer 11b.

Figure 13:
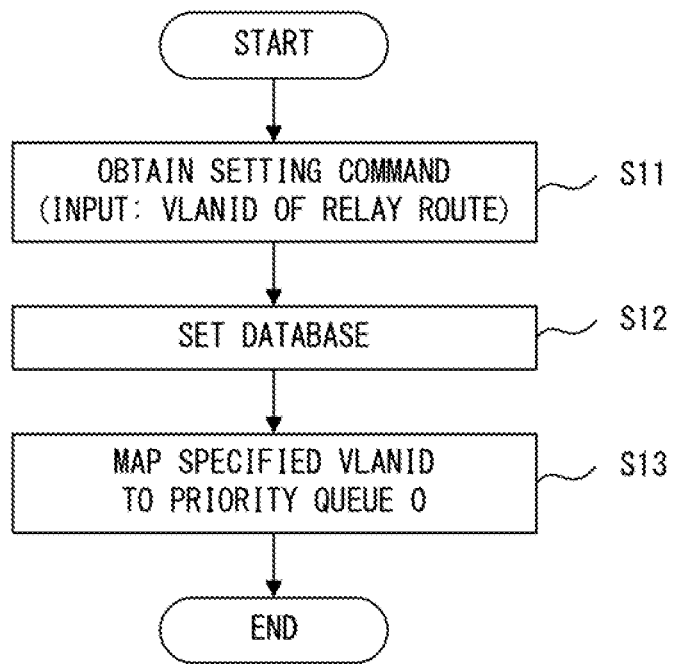
FIG. 13 is a flowchart of an example of the mapping of a relay route.

In S5, the queue distributer 11b performs mapping of the VLANID that identifies each route to the priority queue 1-4, according to the distribution rule. In the example illustrated in FIG. 8A, for example, the route DUa1 is mapped to the priority queue 3, and the route DUa2 is mapped to the priority queue 4. The "mapping" is realized by setting the hardware circuit so that the MFH packet to which the VLANID is assigned is guided to the corresponding to the priority queue, FIG. 13 is a flowchart illustrating an example of the mapping of the relay route. The process in this flowchart is executed in the initial setting before the packet switch 2 starts operations. Meanwhile, the relay route represents a route in which the MFH packet received via another packet switch is transmitted. Hereinafter, the configuration of the functional block diagram in FIG. 11 is used for the explanation.

In S11, the relay route manager 63 obtains a setting command from the maintenance terminal 100. The setting command includes information that indicates the VLANID for each route. In S12, the relay route managing unit 63 stores the setting command in the database 66. Then, in S13, the queue distributer 11b (or the relay route managing unit 63) performs mapping of the VLANID that identifies each relay route to the priority queue 0.

Figure 14:
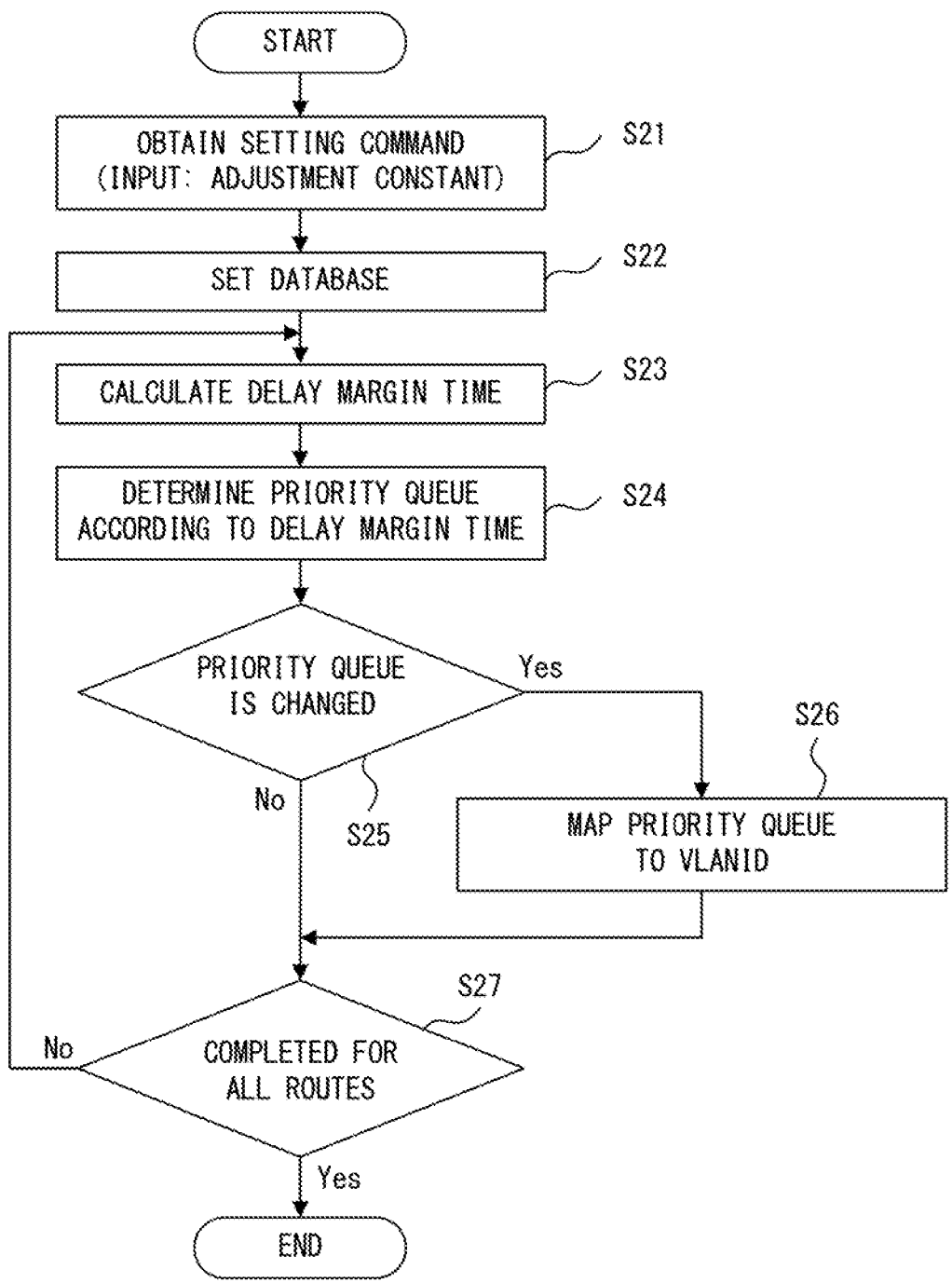
FIG. 14 is a flowchart illustrating an example of a process for changing an adjustment coefficient.

FIG. 14 is a flowchart illustrating an example of a process for changing the adjustment constant. The process in this flowchart is executed when an instruction to change the adjustment constant is given from the maintenance terminal 100 to the packet switch 2. Hereinafter, the configuration of the functional block diagram in FIG. 11 is used for the explanation.

In S21, the delay time manager 61 obtains a setting command from the maintenance terminal 100. The setting command includes information representing a new adjustment constant. Then, in S22, the delay time manager 61 stores the setting command in the database 66.

S23 through S27 are performed with respect to each MFH route. That is, when a new adjustment constant is given, the packet switch 2 executes processes in S23 through S26 during a process in which MFH routes are sequentially selected.

In S23, the margin calculator 22 calculates the delay margin time of the selected route using the new adjustment constant. In S24, the priority queue setting unit 11a determines one of the priority queues 1-4, according to the newly calculated delay margin. In S25, a decision is made as to whether the newly determined priority queue is the same as the current priority queue. Then, when the newly determined priority queue is different from the current priority queue, in S26, the queue distributer 11b performs the mapping of the VLANID that identifies the selected route to the newly determined priority queue.

Figure 15:
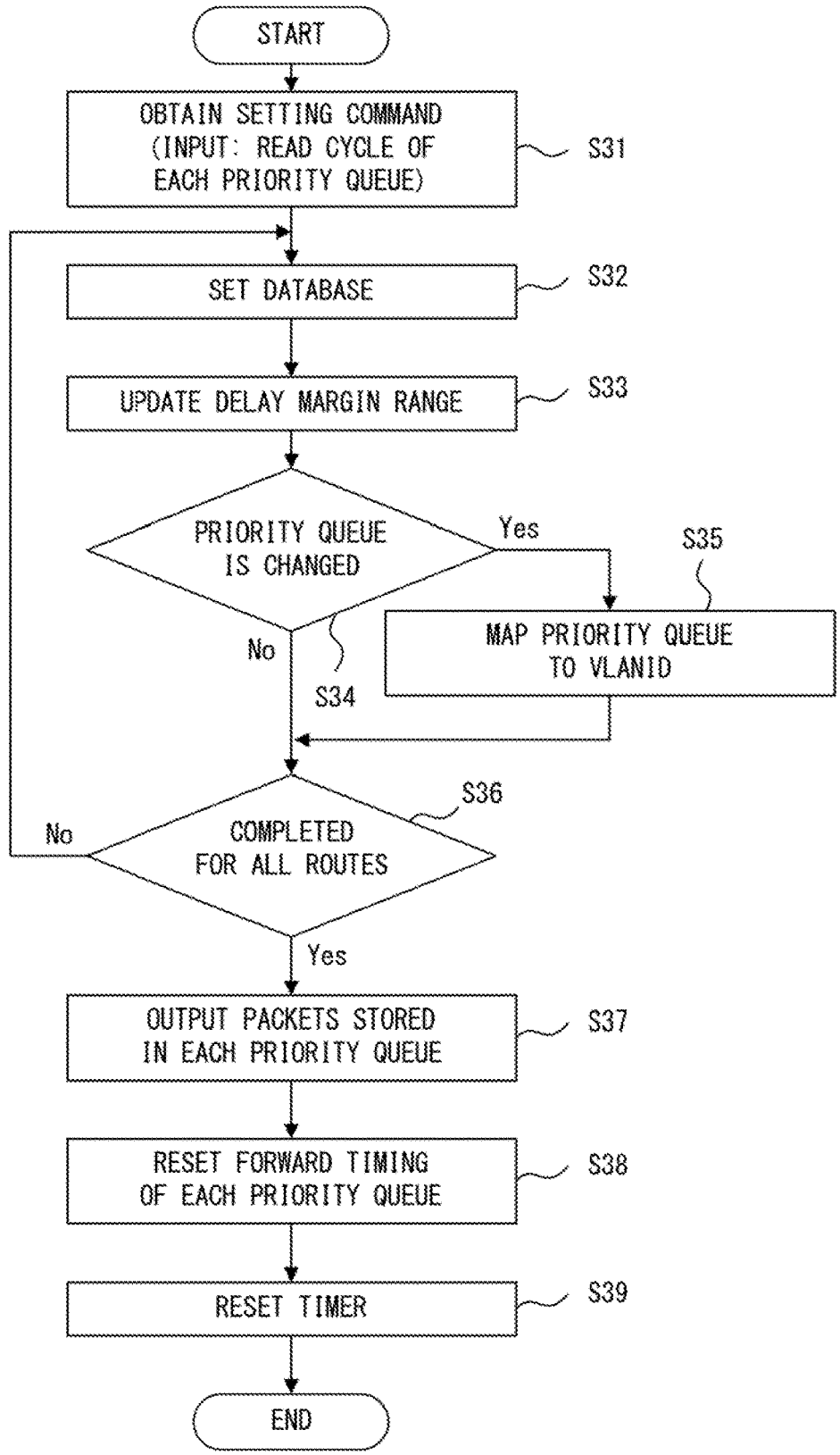
FIG. 15 is a flowchart illustrating a flowchart illustrating an example of a process for changing a forward timing.

FIG. 15 is a flowchart illustrating an example of a process for changing the forward timing. The process in the flowchart is executed when an instruction to change the forward timing is given from the maintenance terminal 100 to the packet switch 2.

In S31, the priority queue manager 65 obtains a setting command from the maintenance terminal 100. The setting command includes information that indicates a new forward timing. In this example, the forward timing is indicated by the reading cycle of the priority queue. That is, the setting command includes information that indicates the reading cycle of each of the priority queues 1-4. Then, in S32, the priority queue manager 65 stores the setting command in the database 66.

In S33, the priority queue manager 65 updates the delay margin range corresponding to each of the priority queues 1-4. That is, the distribution policy illustrated in FIG. 8A is updated. In this example, the delay margin range corresponding to each of the priority queue 1-4 is expressed as follows. Here, it is assumed that the reading cycles of the priority queues 1, 2, 3, 4 are expressed by P1, P2, P3, P4, respectively.

The priority queue 1: "P2" or less
The priority queue 2: "P2" to "P3-1"
The priority queue 3: "P3" to "P4-1"
The priority queue 4: "P4" or more S34 through S36 are performed with respect to each MFH route. That is, when a new adjustment forward timing is given, the packet switch 2 executes processes in S34 to S35 during a process in which MFH routes are sequentially selected.

In S34, the priority queue manager 65 identifies a delay margin range to which the delay margin time of the selected MFH route belongs. Next, a decision is made as to whether the priority queue corresponding to the newly identified delay margin range is the same as the current priority queue. Then, when the newly identified priority queue, is different from the current priority queue, in S35, the queue distributer 11b performs the mapping of the VLANID that identifies the selected route to the newly identified priority queue.

In S37, the read controller 11d reads out and outputs all the MFH packets stored in the priority queues lie (that is, the priority queues 0 through 4). In S38 to S39, the timing setting unit 52 resets the forward timing (that is, the read timing) of each of the priority queues 0-4. At this time, the forward timings of the priority queues 1-4 are set so as to be synchronized with each other. In addition, a timer for counting the forward timing is reset.

Figure 16:
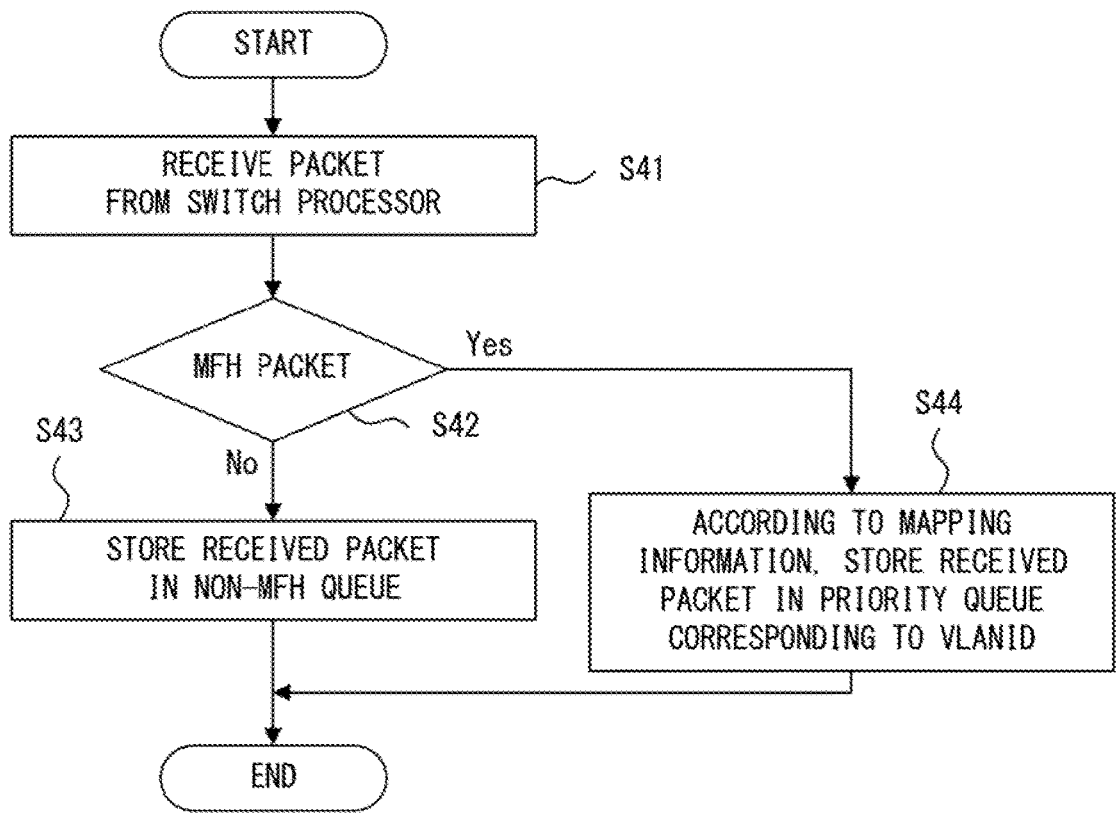
FIG. 16 is a flowchart illustrating an example of a packet receiving process.

FIG. 16 is a flowchart illustrating an example of the packet receiving process. The process of this flowchart is executed when a packet arrives at the packet switch 2.

In S41, the packet processor 33 receives a packet via the switch processor 32. In S42, the MFH/non-MFH distributer 51 decides whether or not the received packet is an MFH packet, according to the header information of the received packet. In this example, whether the received packet is an MFH packet is decided by the VLANID assigned to the received packet.

When the received packet is not an MFH packet, the received packet is scored in the non-MFH queue 12 in S43. Meanwhile, the received packet is an MFH packet, the received packet is guided to the queue distributer 11b. Then, in S44, the queue distributer 11b identifies the MFH route of the packet, according to the header information of the received packet. The MFH route that, transmits the MFH packet is identified by the VLANID in this example. Then, the queue distributer 11b stores the received packet in the priority queue corresponding to the VLANID, according to the mapping information. The mapping information has been created by the processes in the flowcharts illustrated in FIG. 12 and FIG. 13.

As described above, when the received packet is not an MFH packet, the packet is stored in the non-MFH queue 12. On the other hand, when the received packet is an MFH packet, the packet is stored in one of the priority queue 0-4 corresponding to the MFH route.

Figure 17:
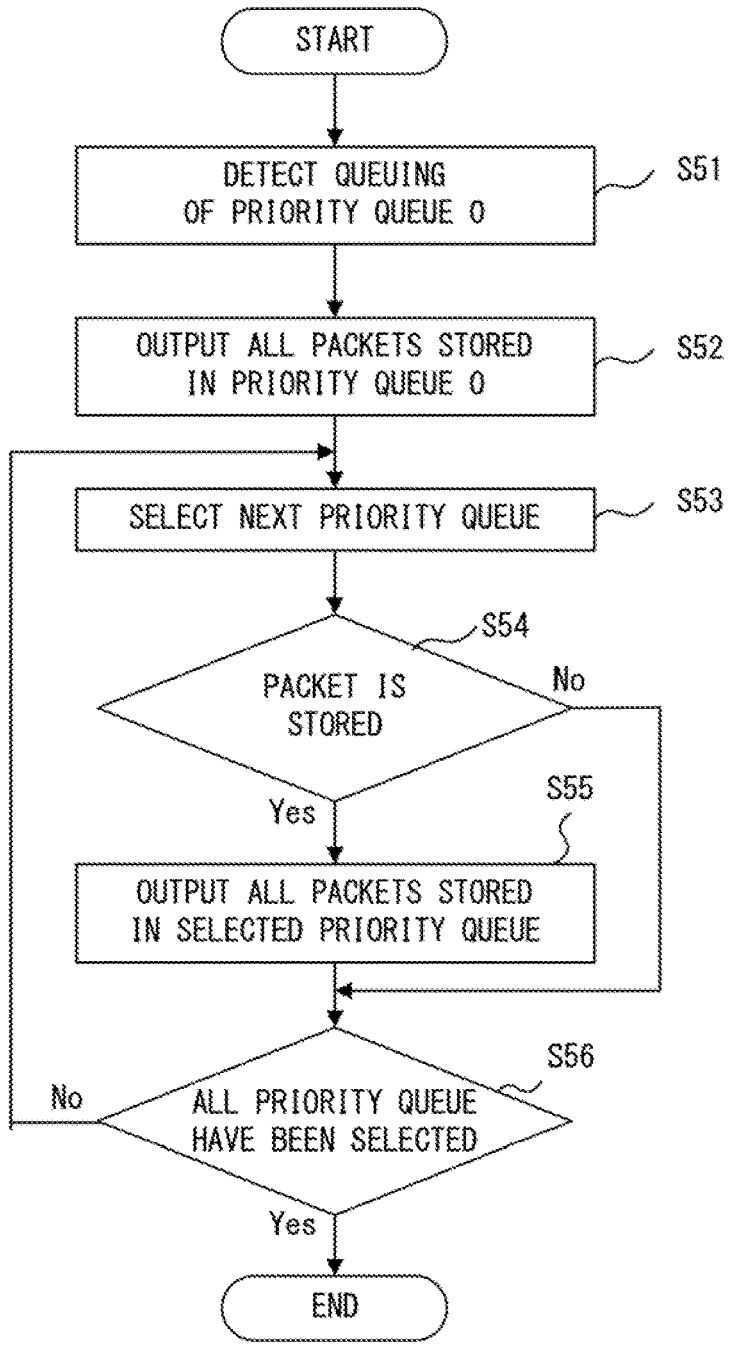
FIG. 17 is a flowchart illustrating an example of a packet forwarding process.

FIG. 17 is a flowchart illustrating an example of the packet forwarding process. The process in this flowchart is executed when an MFH packet arrives at the packet switch 2 via another packet switch. Meanwhile, an MFH packet arriving at the packet switch 2 via another packet switch is stored in the priority queue 0 by the queue distributer 11b.

In S51, the read controller 11d detects the packet queuing of the priority queue 0. That is, the read controller 11d detects that a packet has been stored in the priority queue 0. Then, in S52, the read controller 11d reads out and outputs all the packets stored in the priority queue 0. That is, the MFH packet that arrives at the packet switch 2 is immediately read out and output after it is stored in the priority queue 0 first.

S53 through S56 are executed for each of the priority queues 1-4 other than the priority queue 0. That is, in S53, the read controller 11d selects one of the priority queues 1-4. In S54, a detection is made as to whether a packet is stored in the selected priority queue. Then, when a packet is stored in the selected priority queue, in S55, the read controller 11d reads out and outputs all the packets stored in the selected priority queue.

As described above, when an MFH packet arrives at the packet switch 2 via another packet switch, the MFH packet is immediately forwarded. Next, MFH packets stored in the priority queues 1-4 are also successively forwarded.

Figure 18:
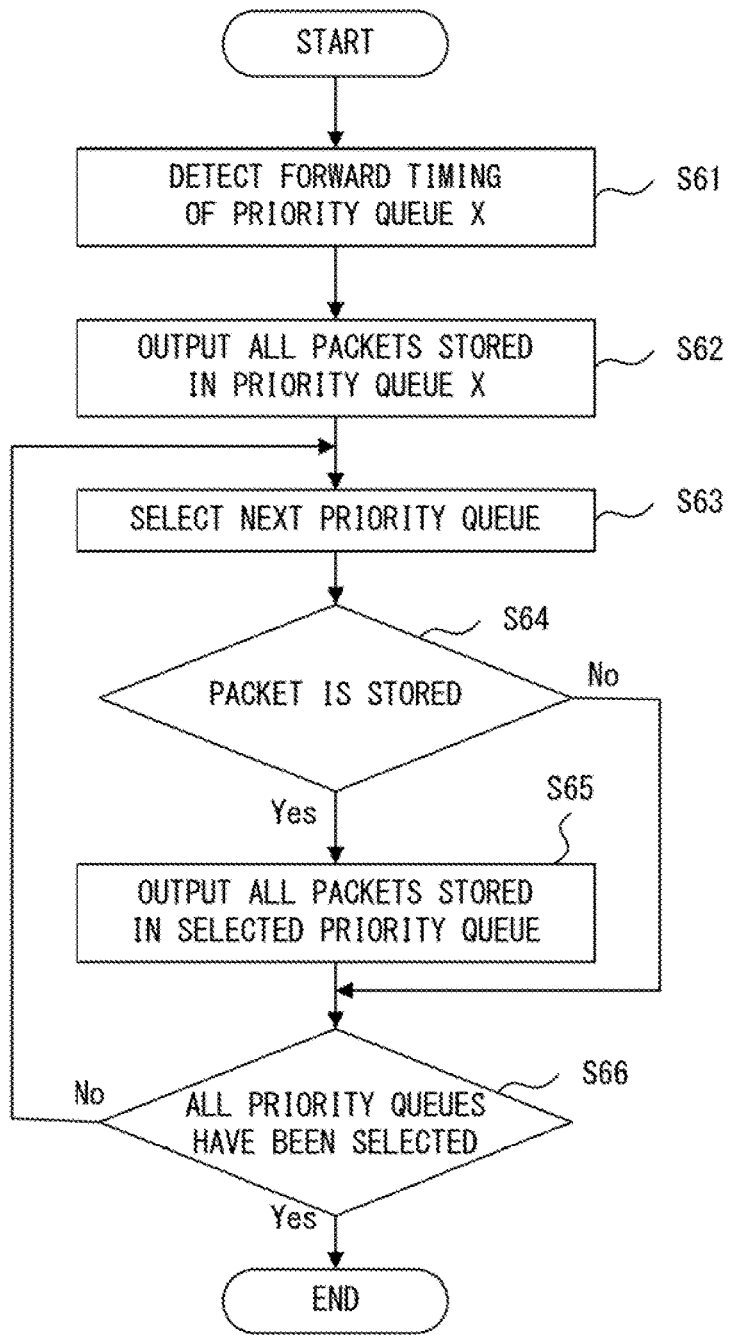
FIG. 18 is a flowchart illustrating another example of a packet forwarding process.

FIG. 18 is a flowchart illustrating another example of the packet forwarding process. The process in this flowchart is executed when a forward timing is detected in any of the priority queues 1-4. Meanwhile, it is assumed that the forward timing of each of the priority queues 1-4 is set in advance by the timing setting unit 52. In addition, the forward timing is detected by a timer that is not illustrated in the drawing, for example.

In S61, the read controller 11d identifies the priority queue in which the forward timing has been detected. In the descriptions below, the priority queue in which the forward timing is detected may be referred to as the priority queue X. In S62, the read controller 11d reads out and outputs all the packets stored in the priority queue X.

The processes in S63 through S66 are substantially the same as those in S53 through S56 illustrated in FIG. 17. However, the processes in S63 through S66 are executed with respect to the priority queues with a reading cycle that is longer than that for the priority queue X. That is, MFH packets that are stored in the priority queues with a reading cycle that is longer than that for the priority queue X are output. For example, when MFH packets stored in the priority queue 2 are read out, then MFH packets stored in the priority queue 3 and the priority queue 4 are successively read out.

As described above, when the forward timing of any of the priority queues is detected, MFH packets stored in the priority queue are output. Next, MFH packets stored in the other priority queues are successively forwarded.

Figure 9:
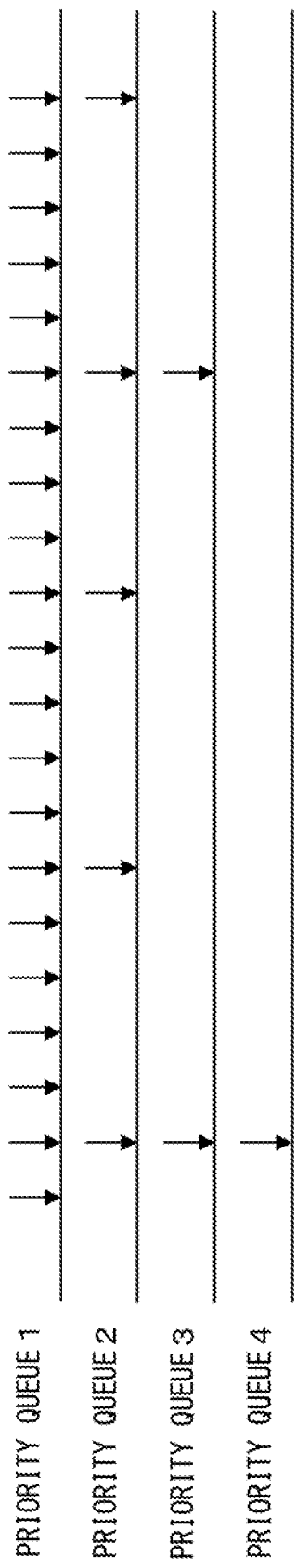
FIG. 9 illustrates an example of the forward timing.

Meanwhile, whim the forward timings of the respective priority queues 1-4 are synchronized with each other as illustrated in FIG. 9, the forward timings of the priority queues 2-4 are included in the forward timings of the priority queue 1. Therefore, in this case, it follows that every time the forward timing of the priority queue 1 occurs, the process in the flowchart illustrated in FIG. 18 is performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate, to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A packet processing device that processes a priority packet and a non-priority packet with a priority lower than the priority of the priority packet in a network that transmits the priority packet and the non-priority packet, the packet processing device comprising:
   a non-priority packet storage that stores the non-priority packet;
   a gate provided on an output side of the non-priority packet storage;
   a plurality of priority packet storages that respectively store the priority packet;
   a distributer that guides a received priority packet to a priority packet storage corresponding to a delay time between a source and a destination of a route through which the received priority packet is transmitted among the plurality of priority packet storages when the packet processing device receives the priority packet;
   a timing setting unit that sets different read cycles to respective priority packet storages;
   a read controller that: reads priority packets from the plurality of priority packet storages according to the read cycles set by the timing setting unit and outputs the read priority packets; and
   a gate controller that controls the gate according to the timings on which the read priority packets are output by the read controller, wherein
   when the read controller reads a first priority packet from one of the plurality of priority packet storages and outputs the first priority packet, the read controller reads a second priority packet from another one of the plurality of priority packet storages and outputs the second priority packet.

2. The packet processing device according to claim 1, further comprising a margin calculator that calculates a delay margin time of each route according to a difference between a maximum delay time of a priority packet and a delay time of corresponding route, wherein
   the distributer stores a priority packet in a corresponding priority packet storage according to the delay margin time of a route through which a priority packet is transmitted.

3. The packet processing device according to claim 2, the shorter the delay margin time corresponding the priority packet storage is, the shorter the reading cycle for the priority packet storage is.

4. The packet processing device according to claim 1, wherein
   when the packet processing device receives a priority packet via another packet processing device, the distributer stores the priority packet in a predetermined priority packet storage among the plurality of priority packet storages, and
   when a priority packet is stored in the predetermined priority packet storage, the read controller immediately reads the priority packet from the predetermined priority packet storage and outputs the priority packet.

5. The packet processing device according to claim 4, wherein when the read controller reads a priority packet from the predetermined priority packet storage and outputs the priority packet, the read controller reads priority packets from the other priority packet storages and outputs the priority packets.

6. A network system that transmits a priority packet and a non-priority packet with a priority lower than the priority of the priority packet, the network system including a plurality of packet switches, wherein
   each of the plurality of packet switches comprises:
   a non-priority packet storage that stores the non-priority packet;
   a gate provided on an output side of the non-priority packet storage;
   a plurality of priority packet storages that respectively store the priority packet;
   a distributer that guides a received priority packet to a priority packet storage corresponding to a delay time between a source and a destination of a route through which the received priority packet is transmitted among the plurality of priority packet storages when the packet switch receives the priority packet;
   a timing setting unit that sets different read cycles to respective priority packet storages;

a read controller that reads priority packets from the plurality of priority packet storages according to the read cycles set by the timing setting unit and outputs the read priority packets; and a gate controller that controls the gate according to the timings on which the read priority packets are output by the read controller, wherein when the read controller reads a priority packet from one of the plurality of priority packet storages and outputs the priority packet, the read controller reads a priority packet from another one of the plurality of priority packet storages and outputs the priority packet.

* * * * *